(12) United States Patent
Widman

(10) Patent No.: US 7,864,954 B2
(45) Date of Patent: Jan. 4, 2011

(54) METHOD AND SYSTEM FOR ENCRYPTION AND AUTHENTICATION

(75) Inventor: Mathias Widman, Alingsås (SE)

(73) Assignee: Impsys AB, Alingsas (SE)

( * ) Notice: Subject to any disclaimer, the term of this patent is extended or adjusted under 35 U.S.C. 154(b) by 1107 days.

(21) Appl. No.: 10/239,581

(22) PCT Filed: Mar. 26, 2001

(86) PCT No.: PCT/SE01/00648

§ 371 (c)(1),
(2), (4) Date: Jan. 17, 2003

(87) PCT Pub. No.: WO01/74007

PCT Pub. Date: Oct. 4, 2001

(65) Prior Publication Data

US 2003/0156721 A1    Aug. 21, 2003

(30) Foreign Application Priority Data

Mar. 24, 2000  (SE) .................................... 0001044

(51) Int. Cl.
  *H04L 9/00*  (2006.01)
  *H04L 9/08*  (2006.01)
  *H04L 9/12*  (2006.01)
(52) U.S. Cl. .................... 380/47; 380/44; 380/283; 380/278; 380/277; 713/168
(58) Field of Classification Search ............... None
  See application file for complete search history.

(56) References Cited

U.S. PATENT DOCUMENTS

| | | | |
|---|---|---|---|
| 4,799,061 A * | 1/1989 | Abraham et al. | 340/5.26 |
| 4,876,716 A * | 10/1989 | Okamoto | 380/285 |
| 5,136,642 A * | 8/1992 | Kawamura et al. | 380/282 |
| 5,216,715 A * | 6/1993 | Markwitz | 713/171 |
| 5,237,611 A * | 8/1993 | Rasmussen et al. | 380/284 |
| 5,251,258 A * | 10/1993 | Tanaka | 380/282 |
| 5,319,712 A * | 6/1994 | Finkelstein et al. | 380/44 |
| 5,455,862 A | 10/1995 | Hoskinson | |
| 5,467,398 A * | 11/1995 | Pierce et al. | 380/44 |
| 5,790,677 A * | 8/1998 | Fox et al. | 705/78 |

(Continued)

FOREIGN PATENT DOCUMENTS

WO    WO 98/03026    1/1998

OTHER PUBLICATIONS

Patent Abstract of Japan, 63-187830, Aug. 3, 1988, Shigeno Takeshi.

(Continued)

*Primary Examiner*—Syed A. Zia
(74) *Attorney, Agent, or Firm*—Harness, Dickey & Pierce, P.L.C.

(57) ABSTRACT

A method and a system for encrypted transmission or authentication between at least two units via an insecure communication channel, comprising the steps of: (a) in an initiation procedure, producing a common original value to be used in the respective units; (b) synchronising a counting value in each unit; (c) generating a key on the basis of the original value and the counting value in each unit, independently of other units; and (d) using the thus generated key in a subsequent encrypted transmission or authentication operation.

24 Claims, 2 Drawing Sheets

U.S. PATENT DOCUMENTS

| | | | |
|---|---|---|---|
| 5,960,086 A * | 9/1999 | Atalla | 380/44 |
| 6,097,813 A * | 8/2000 | Vanstone et al. | 380/30 |
| 6,105,008 A * | 8/2000 | Davis et al. | 705/41 |
| 6,981,154 B2 * | 12/2005 | Wheeler et al. | 726/4 |
| 7,657,488 B2 * | 2/2010 | Silverbrook et al. | 705/50 |
| 7,752,441 B2 * | 7/2010 | Mizikovsky et al. | 713/168 |
| 2003/0196099 A1 * | 10/2003 | Lampson et al. | 713/189 |
| 2005/0235152 A1 * | 10/2005 | Ozaki et al. | 713/170 |
| 2006/0120531 A1 * | 6/2006 | Semple et al. | 380/270 |

OTHER PUBLICATIONS

Patent Abstract of Japan, 63-232539, Sep. 28, 1988, Shigeno Takeshi.
Digital cellular telecommunications system (Phase 2+); Security related network functions (GSM 03.20 version 6.1.0 Release 1997) 71 pages.
Bluetooth Specification; Nov. 29, 1999.

* cited by examiner

METHOD AND SYSTEM FOR ENCRYPTION AND AUTHENTICATION

TECHNICAL FIELD

The present invention relates to a method and a system for secure encrypted transmission or authentication between at least two units via an insecure communication channel.

BACKGROUND

Normally, it is difficult to achieve secure encrypted transmission via insecure communication channels, such as public telephone lines, data networks, in radio-transmission operations, and so on. Conventional encrypting algorithms require that keys in the form of private or public keys be transmitted between the units. Such key transmission does, however, cause practical problems. The keys may be transmitted on separate secure channels, but this solution is inconvenient, expensive and time-consuming. Alternatively, the keys may be transmitted via the insecure channel on which the encrypted message is then to be transmitted. However, this procedure involves a security risk. Also when encrypting systems having so called open keys are used, such as the RSA system, the transmission of the key means that larger and more complex keys and encrypting algorithms are required in order to ensure that the encrypted transmission is sufficiently secure, which naturally involves increased inconvenience and costs.

Similar problems are encountered in order to provide secure verification of units, so called authentication, via insecure communication channels. Such authentication is based on transmission between the units of data that are based on a unique key. For example, the key may be used to encrypt a check sum based on a transmitted or received message. Also in this case one is confronted with the same problems as those found in other encrypted transmission in the case of transmission of keys between the units.

OBJECT OF THE INVENTION

Consequently, one object of the present invention is to provide a method and a system of encrypted transmission and authentication via an insecure communication channel that completely or at least partly solve the above stated problems found in the prior-art technology.

This object is achieved by means of a method and a system as defined in the appended claims.

BRIEF DESCRIPTION OF THE DRAWINGS

The invention will be described in more detail in the following with the aid of one embodiment and with reference to the appended claims, wherein:

DESCRIPTION OF PREFERRED EMBODIMENTS

Figure 1:
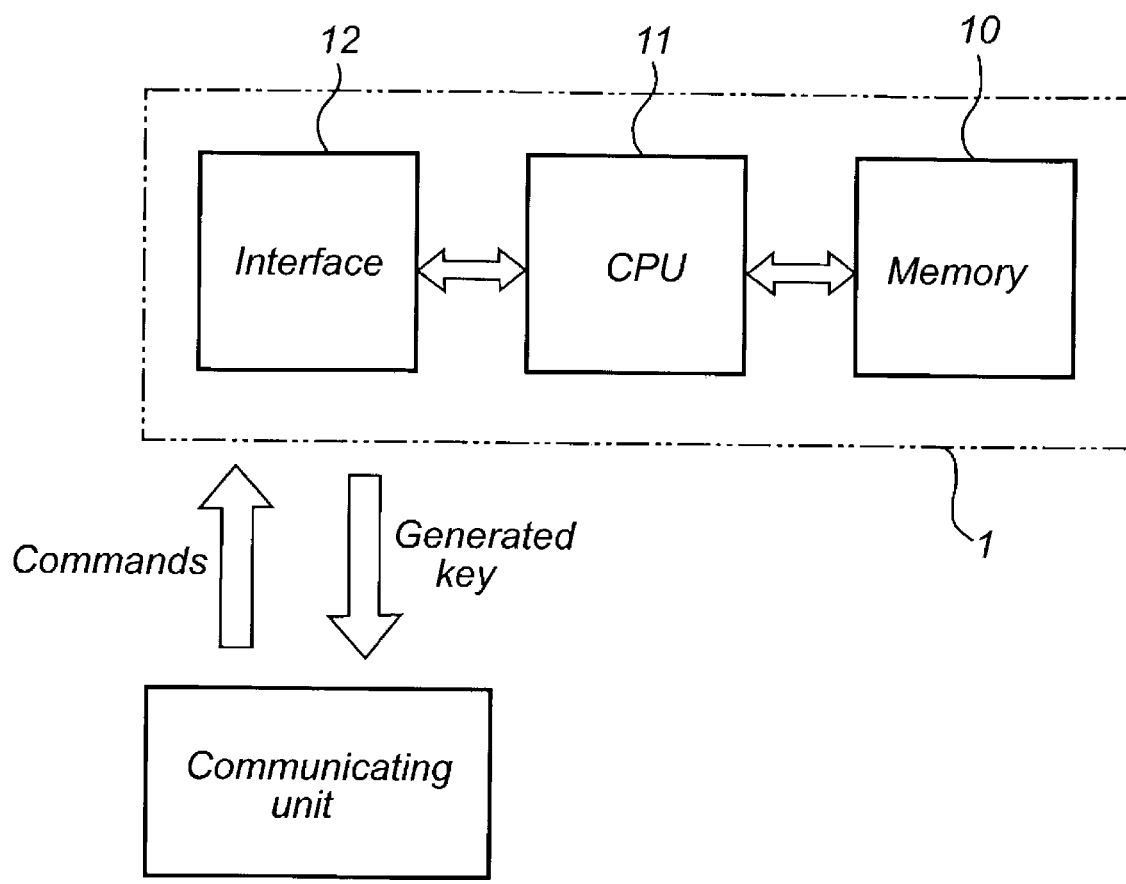
FIG. 1 is a schematic view of a key-generating unit in accordance with one embodiment of the invention.

The invention relates to a system for secure encrypted transmission/authentication between at least two units via an insecure communication channel. The communication channel could be any channel via which data may be transmitted, and more specifically, the channel could be stationary as well as wireless. Each such unit comprises a key-generating unit 1, as shown in FIG. 1. This kind of key-generating units comprise a memory 10, wherein identical original values U, so called seeds, have been stored, preferably in a dynamic and/ inter-/exchangeable manner. The storage of original values preferably is effected in connection with the introductory initiation of the units, and advantageously it could be effected via a secure channel. Possibly, the original values need not, however, be transmitted physically but instead the users of the units concerned may themselves input an agreed-upon value. In addition, the original values may be exchanged, when needed, but alternatively the same original values are used for the duration of the entire life of the key-generating unit. In this case the original values need not be stored in dynamic memories, but instead permanent memories may be used.

In addition, the key-generating units comprise a counter to periodically change a counting value R, and a calculating unit adapted to generate, in each and every unit and independently of other units, a key based on the original value, and a counting value issued by the counter. Advantageously however, the counter and the calculating unit may be integrated in the same unit 11, which advantageously may be a micro-processor, such as a commercially available CPU. The counter may advantageously be controlled by an oscillator or a clock, which could likewise be integrated in unit 11. Preferably a real-time-based clock, which is integrated with the CPU 11, is used. In addition, the counter is increased stepwise by integers, whereby it becomes easier to keep the units in phase with one another (synchronised).

Provided that the same original values are stored in the memory 10 and that the counters are synchronised to deliver the same counting value, identical keys may be generated in several key-generating units, independently of one other. These keys may then be used for encrypting or authenticating purposes between the units.

Furthermore, the key-generating units preferably are adapted to sense whether they are synchronised or not, and in case they are not, to implement this synchronisation. Sensing may be performed by means of a particular synchronising test that is performed prior to the generation of keys. Alternatively, a need for synchronisation may, however, be identified when different keys are used, and only thereafter may synchronisation resetting be effected. Synchronisation may be effected for example by exchange of counting values between the units.

The calculating unit comprises a calculating algorithm F, which uses the original value and the counting value as input parameters, i.e. $F=f(R,U)$. This calculating algorithm preferably is implemented in hardware in the calculating unit, or alternatively it is stored in a non-dynamic and unchangeable memory. The calculating algorithm preferably generates a 128-bit key, but keys of other lengths are of course also conceivable. Every time an order is given to the key generator to produce a new key therefore a new pseudo-random 128-bit word is generated, which is calculated on the basis of the "seed" and the counting value.

The key-generating unit 1 further comprises an interface part 12 serving to enable communication between the communicating unit and the key-generating unit. Preferably, this communication comprises emission of instructions to the key-generating unit to generate a key and the emission of a thus generated key back to the communicating unit.

Advantageously the key-generating unit is implemented in hardware and executed in the form of an integrated circuit, thereby making it more difficult to tamper with. This circuit may then be added to and used together with essentially any type of communicative unit. For example, it is possible to use the key-generating unit in accordance with the invention together with rechargeable cards, so called smart cards, in portable or stationary computers, in mobile telephones, electronic calendars and similar electronic equipment that is communicative.

However, it is likewise possible to implement the key-generating unit in software for example in a conventional computer, and to use existing memories and the like. This alternative is particularly advantageous for implementation in stationary units, and in particular units that are used as central units.

The key-generating units in accordance with the invention may be used either for point-to-point communication or authentication, i.e. between two units, or between a central unit, a server, or several users, clients. Such a central unit preferably comprises a plurality of different key-generating units, one for each client in communication with the central unit. Alternatively, a key unit could comprise several different original values, in which case the command to the key-generating unit to generate a key also comprises information regarding which original value should be used. It is likewise possible for several units that communicate with the central unit to have identical key-generating units, enabling them to communicate with the same key-generating unit in the central unit.

In the case of a central unit, adapted to communicate with several other units, the central unit preferably comprises a means for software implementation of the key generation unit whereas the clients have hardware implemented means. For example, the clients could be smart cards or mobile telephones, computers and the like. Thus, the system in accordance with the invention may be used between a bank and its clients, between enterprises and their employees, between a company and its subsidiaries, and so on. In addition, the system may be used to control access to home pages via Internet or the like, for example by connecting its smart card to a reader provided for that purpose, and in this manner it becomes possible also to control the access to electronic equipment that communicates wireless for example via Bluetooth.

Also units that are not central units may comprise several original values, in the same key-generating device or in separate units, in order to communicate via several separate channels. In this manner the unit may be used for communication with several different central units. For example, a smart card may be used for communication with several different banks or other establishments.

Figure 2:
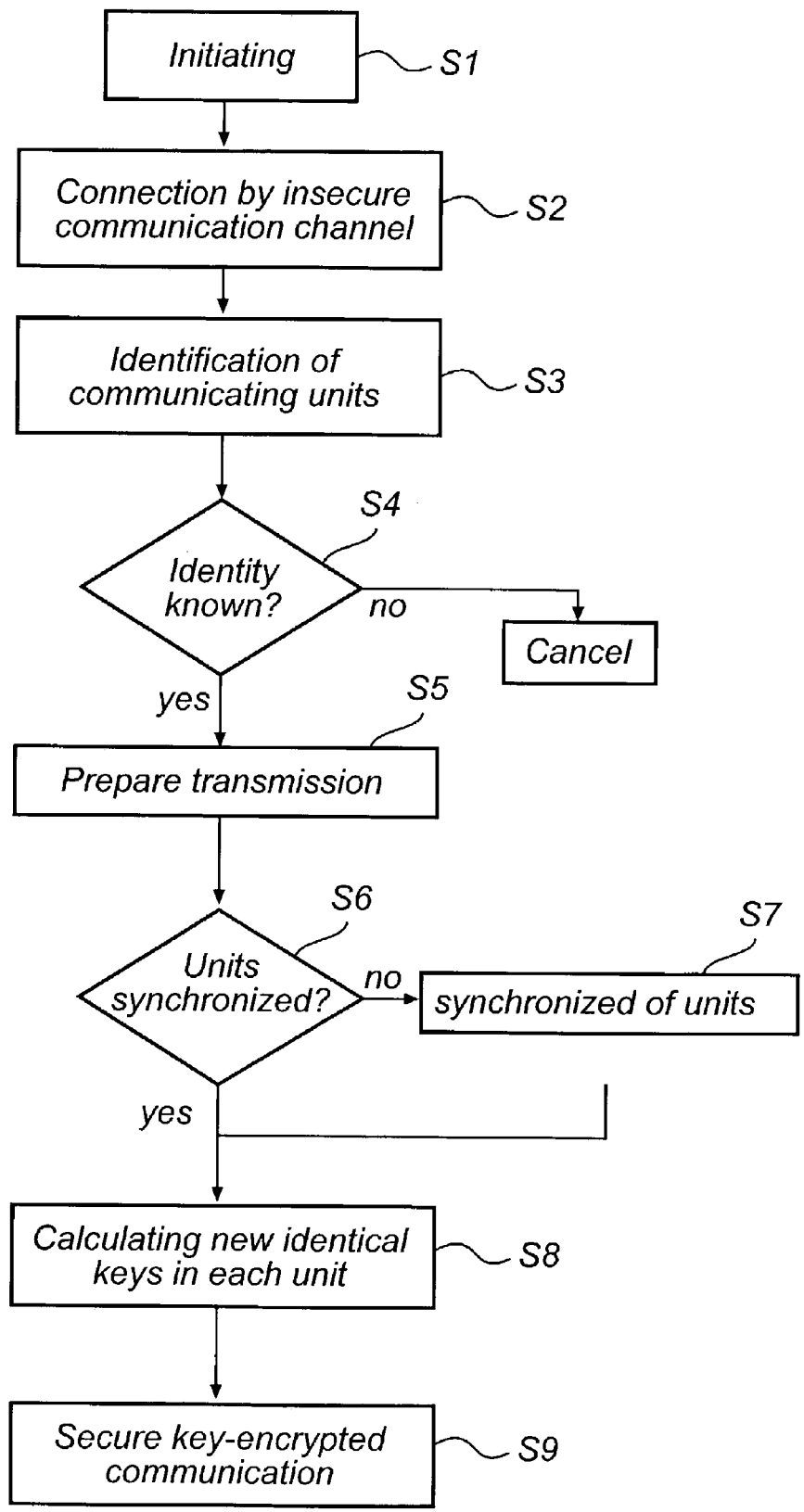
FIG. 2 is a flow chart for performing encrypted transmission or authentication in accordance with one embodiment of the invention.

In the following an encrypted transmission or authentication with the aid of the system of the invention will be described with reference to FIG. 2. In a first step S1, the units intended for future intercommunication are initiated, in which process they are provided with identical original values and preferably are also synchronised. The system is now ready for use, and at a later time, which may occur after the lapse of an arbitrary period of time after the initiation, the units are interconnected via an insecure communication channel (step S2), and at least one of the unit identifies itself to the other (step S3). In step S4, the other unit determines whether the identity given is known and whether it has a corresponding key-generating circuit, i.e. a key-generating circuit as defined above and with a corresponding original value. If this is the case, the process proceeds to step S5, otherwise the process is interrupted.

The units then agree to execute encrypted transmission or authentication, whereby each one separately calculates keys in the respective key-generating unit (step S8). Before this happens, a synchronisation test (S6) might have been made to investigate whether the counters in the respective key-generating units are synchronised. If this is the case, the process continues directly to step S8, otherwise a synchronisation step (S7) is first executed to reset the inter-unit synchronisation. Step S7 could, however, alternatively be omitted and the process of identifying that the units are no longer synchronised could instead be effected by reckoning that identical keys have not been used. In this case, the process thereafter executes the synchronisation step S7 and then returns to step S8 in order to again calculate keys in the respective units.

The calculated keys are then used to execute encrypted transmission or authentication. It should be understood, however, that encrypted transmission and authentication of course may be effected simultaneously and in the same process. Encrypting and authentication may be effected with the aid of essentially any encrypting algorithm that uses keys, as the known RFSM and RSA algorithms.

The invention may be used for authentication, i.e. verification that the unit with which one communicates is the one it claims to be, as well as for key-generation for encrypted transmission purposes. The units that are used in connection with the present invention, such as smart cards, telephones and the like, could however advantageously be equipped with means arranged to ensure that the unit user is the correct one, i.e. authentication between users and the communicating unit. Such authentication may be effected with the aid of input of a code, identification of finger-prints and the like.

The system and the method in accordance with the invention provides a simple and inexpensive way of achieving a high degree of security in encrypted transmission and authentication, since the invention makes it possible to create the same key synchronously in two different places and without exchange of information, or possibly with exchange of information as to which key in the sequence is to be created, i.e. the counting value. Consequently, no keys need be exchanged to execute authentication or encrypted transmission between two units, such as between a server and a client, or vice versa. This makes it possible to use shorter keys as well, which provides for less expensive and more efficient transmission while at the same time security is maintained or even is increased in comparison with conventional systems. Thanks to the invention a large portion of the security means may to a large extent be hardware-integrated, which increases the security even more, since preferably in this case only the seed is exchangeable and normally only the generated keys are accessible from outside.

Several varieties of the system and the method described above are possible. For example, the method and the system do not depend on the encrypting or authentication method used but may be used in a simple and secure manner to generate keys, and consequently it may be used together with most known methods of this kind. In addition, the key-generating unit preferably is implemented in hardware, which makes the key-generating process completely hidden to the user. It is, however, also possible to implement the key-generating unit in software in an ordinary computer. In addition, the units in the system may be essentially any communicative electronic units. The counters used to generate the counting values for the key-generating units could also be of any type, provided that they generate counting values that vary with time. It is likewise possible to omit counters in one or several units, and in this case the step of synchronising the counters is replaced by a step involving exchange of counting values between the units, i.e. to synchronise the counting values, before each key-generating operation. Such and other obvious varieties must be regarded to be within the scope of protection of the invention as the latter is defined in the appended claims.

The invention claimed is:

1. A method for encrypted transmission or authentication between at least two key-generating units via an insecure communication channel, comprising the initiation steps of:
   in an initiation procedure, obtaining a common original value to be used in the respective key-generating units; and
   interconnecting the at least two key-generating units via the insecure communications channel,
   wherein the method for each encrypted transmission or authentication between the at least two key-generating units via the insecure communication channel further comprises the session steps of,
   changing autonomously, in a synchronised and periodical fashion, a common counting value in each key-generating unit,
   generating a common key on the basis of the original value and the counting value in each key-generating unit, independently of other key-generating units, wherein the key generation in each key-generating unit takes place without use of any information received from other key-generating units, and
   using the thus generated keys in a subsequent encrypted transmission or authentication operation, and
   wherein the key-generating units are configured to detect when the key-generating units are not synchronised and to then restore synchronisation.

2. The method as claimed in claim 1, wherein the original value is saved in a dynamic and exchangeable fashion at least in one of the key-generating units.

3. The method as claimed in claim 1, wherein the counting value is generated in a counter in each key-generating unit, the synchronisation of the counting values involving synchronisation of the counters.

4. The method as claimed in claim 1, wherein the key-generating operation on the basis of the original value and the counting value is effected by means of a calculating algorithm stored in a non-dynamic and non-changeable fashion in at least one of the key-generating units.

5. The method as claimed in claim 1, wherein at least one of the key-generating units is a mobile unit, such as a smart card or a mobile telephone.

6. The method as claimed in claim 1, wherein one of the key-generating units is a central unit comprising a plurality of original values for secure encrypted transmission or authentication with relation to several different key-generating units having one original value each.

7. The method as claimed in claim 1, wherein changing autonomously, in a synchronised and periodical fashion, the common counting value in each key-generating unit includes changing the common counting value in each of the at least two key-generating units, respectively, so that the common counting values for the at least two key-generating units are the same.

8. The method as claimed in claim 2, wherein the counting value is generated in a counter in each unit, the synchronisation of the counting values involving synchronisation of the counters.

9. The method as claimed in claim 2, wherein the key-generating operation on the basis of the original value and the counting value is effected by a calculating algorithm stored in a non-dynamic and non-changeable fashion in at least one of the units.

10. The method as claimed in claim 2, wherein at least one of the units is a mobile unit, such as a smart card or a mobile telephone.

11. The method as claimed in claim 2, wherein one of the units is a central unit comprising a plurality of original values for secure encrypted transmission or authentication with relation to several different units having one original value each.

12. The method as claimed in claim 3, wherein following the initial synchronisation of the counters, the key-generating units execute supplementary synchronisation steps only when a lack of synchronization is detected.

13. A system for encrypted transmission/authentication between at least two units via an insecure communication channel, wherein each unit comprises:
    a key-generating unit, the key-generating units comprising a memory, in which identical original values are stored, a counter configured to periodically and autonomously change a counting value, the counting value being common for the at least two units and, the change being synchronized between the at least two units: and
    a calculating unit configured to generate in each unit and independently of other units, a key on the basis of the original value and a counting value issued from the counter, wherein the key generation in each unit takes place without use of any information received from other units, the keys being configured to be used for encrypted transmission or authentication between the units,
    wherein the key-generating units are configured to detect when the key-generating units are not synchronised and to then restore synchronisation.

14. The system as claimed in claim 13, wherein the memory for storing of the original value in at least one of the units is a dynamic memory configured to store the original value in a dynamic and exchangeable fashion.

15. The system as claimed in claim 13, wherein the calculating unit of at least one of the units comprises a calculating algorithm, which is stored in a non-dynamic and non-changeable fashion, and which is hardware-implemented.

16. The system as claimed in claim 13, wherein at least one of the units is a mobile unit, such as a smart card or a mobile telephone.

17. The system as claimed in claim 13, wherein one of the units is a central unit comprising a plurality of original values for secure encrypted transmission or authentication involving several different units having one original value each.

18. The system as claimed in claim 13, wherein the calculating unit of at least one of the units comprises a calculating algorithm, which is stored in a non-dynamic and non-changeable fashion, and which is hardware-implemented.

19. The system as claimed in claim 13, wherein the counter is further configured to change the common counting value in each of the at least two units, respectively, so that the common counting values for the at least two units are the same.

20. The system as claimed in claim 14, wherein the calculating unit of at least one of the units comprises a calculating algorithm, which is stored in a non-dynamic and non-changeable fashion, and which is hardware-implemented.

21. A method for encrypted transmission or authentication between at least two key-generating units via an insecure communication channel, comprising the initiation steps of:
    in an initiation procedure, obtaining a common original value to be used in the respective key-generating units; and
    interconnecting the at least two key-generating units via the insecure communications channel, wherein the method for each encrypted transmission or authentication between the at least two key-generating units via the insecure communication channel further comprises the session steps of changing autonomously, in a synchronised and periodical fashion, a common counting value in each key-generating unit, generating a common key on the basis of the original value and the counting value in each key-generating unit, independently of other key-generating units, wherein the key generation in each key-generating unit takes place without use of any information received from other key-generating units, and using the thus generated keys in a subsequent encrypted transmission or authentication operation, and wherein the key-generating operation on the basis of the original value and the counting value is effected by means of a calculating algorithm stored in a non-dynamic and non-changeable fashion in at least one of the key-generating units.

22. A method for encrypted transmission or authentication between at least two key-generating units via an insecure communication channel, comprising the initiation steps of:

in an initiation procedure, obtaining a common original value to be used in the respective key-generating units; and interconnecting the at least two key-generating units via the insecure communications channel, wherein the method for each encrypted transmission or authentication between the at least two key-generating units via the insecure communication channel further comprises the session steps of changing autonomously, in a synchronised and periodical fashion, a common counting value in each key-generating unit, generating a common key on the basis of the original value and the counting value in each key-generating unit, independently of other key-generating units, wherein the key generation in each key-generating unit takes place without use of any information received from other key-generating units, and using the thus generated keys in a subsequent encrypted transmission or authentication operation, and wherein the original value is saved in a dynamic and exchangeable fashion at least in one of the key-generating units, and the key-generating operation on the basis of the original value and the counting value is effected by a calculating algorithm stored in a non-dynamic and non-changeable fashion in at least one of the key-generating units.

23. A method for encrypted transmission or authentication between at least two key-generating units via an insecure communication channel, comprising the initiation steps of:

in an initiation procedure, obtaining a common original value to be used in the respective key-generating units; and interconnecting the at least two key-generating units via the insecure communications channel, wherein the method for each encrypted transmission or authentication between the at least two key-generating units via the insecure communication channel further comprises the session steps of changing autonomously, in a synchronised and periodical fashion, a common counting value in each key-generating unit, generating a common key on the basis of the original value and the counting value in each key-generating unit, independently of other units, wherein the key generation in each key-generating unit takes place without use of any information received from other key-generating units, and using the thus generated keys in a subsequent encrypted transmission or authentication operation, and wherein changing autonomously, in a synchronised and periodical fashion, the common counting value in each key-generating unit includes changing the common counting value in each of the at least two key-generating units, respectively, so that the common counting values for the at least two key-generating units are the same.

24. A system for encrypted transmission/authentication between at least two units via an insecure communication channel, wherein each unit comprises:

a key-generating unit, the key-generating units comprising a memory, in which identical original values are stored, a counter configured to periodically and autonomously change a counting value, the counting value being common for the at least two units and, the change being synchronized between the at least two units, and a calculating unit configured to generate in each unit and independently of other units, a key on the basis of the original value and a counting value issued from the counter, wherein the key generation in each unit takes place without use of any information received from other units, the keys being configured to be used for encrypted transmission or authentication between the units, wherein the counter is further configured to change the common counting value in each of the at least two units, respectively, so that the common counting values for the at least two units are the same.

* * * * *